(12) United States Patent
Naphade et al.

(10) Patent No.: US 9,683,184 B2
(45) Date of Patent: Jun. 20, 2017

(54) METHOD AND APPARATUS FOR GASIFICATION

(71) Applicant: General Electric Company, Schenectady, NY (US)

(72) Inventors: Pravin Sadashiv Naphade, Bangalore (IN); Avish Ivan Dsouza, Bangalore (IN); Richard Anthony De Puy, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 724 days.

(21) Appl. No.: 13/912,034

(22) Filed: Jun. 6, 2013

(65) Prior Publication Data

US 2014/0360098 A1    Dec. 11, 2014

(51) Int. Cl.
    *C10J 3/00*        (2006.01)
    *C10J 3/72*        (2006.01)

(52) U.S. Cl.
    CPC ....... *C10J 3/723* (2013.01); *C10J 2300/0906* (2013.01); *C10J 2300/0909* (2013.01); *C10J 2300/0969* (2013.01); *C10J 2300/0976* (2013.01); *C10J 2300/165* (2013.01); *C10J 2300/1653* (2013.01); *C10J 2300/1675* (2013.01); *C10J 2300/1687* (2013.01); *C10J 2300/1815* (2013.01); *C10J 2300/1876* (2013.01); *C10J 2300/1884* (2013.01); *C10J 2300/1892* (2013.01); *Y02E 20/16* (2013.01); *Y02E 20/18* (2013.01)

(58) Field of Classification Search
    CPC ................................................ C10J 2300/1253
    See application file for complete search history.

(56) References Cited

U.S. PATENT DOCUMENTS

| 4,175,929 | A | * | 11/1979 | Frumerman | ............... | C10J 3/16 |
| | | | | | | 48/202 |
| 4,497,637 | A | | 2/1985 | Purdy et al. | | |
| 5,937,652 | A | | 8/1999 | Abdelmalek | | |
| 6,485,296 | B1 | * | 11/2002 | Bender | ....................... | C10J 3/14 |
| | | | | | | 110/203 |
| 8,137,655 | B2 | | 3/2012 | Chornet et al. | | |
| 2003/0106266 | A1 | * | 6/2003 | Bryan | ....................... | F02C 3/20 |
| | | | | | | 48/197 FM |
| 2007/0284453 | A1 | * | 12/2007 | Tsangaris | ................. | C10J 3/002 |
| | | | | | | 237/12 |
| 2010/0270505 | A1 | | 10/2010 | Gallaspy et al. | | |
| 2010/0301273 | A1 | | 12/2010 | Blasiak et al. | | |
| 2013/0011803 | A1 | * | 1/2013 | Siemons | ................. | B01J 6/008 |
| | | | | | | 432/9 |

* cited by examiner

*Primary Examiner* — Matthew Merkling
(74) *Attorney, Agent, or Firm* — Fletcher Yoder, P.C.

(57) ABSTRACT

A gasification system includes a gasifier configured to gasify a feedstock and an oxidant to generate a producer gas, a steam generator configured to supply steam to the gasifier, and a combustion system configured to supply an exhaust gas to the steam generator to produce the steam. The system also includes an exhaust gas injection system located upstream of the gasifier and fluidly coupled to the gasifier. The exhaust gas injection system is configured to supply a portion of the exhaust gas from the combustion system to the gasifier.

23 Claims, 3 Drawing Sheets

METHOD AND APPARATUS FOR GASIFICATION

BACKGROUND

The subject matter disclosed herein relates to gasification systems, and more particularly, to systems for gasification.

Several types of feedstock (e.g., coal, biomass) may be gasified for use in the production of electricity, chemicals, synthetic fuels, or for a variety of other applications. Gasification often involves the partial oxidation of the feedstock and a series of other reactions, resulting in production of combustible gases including carbon monoxide (CO), hydrogen ($H_2$), and traces of methane ($CH_4$), or in other words, producer gas. The producer gas may be used to run internal combustion engines, for example as a substitute for furnace oil, and may also be used to produce methanol, oxochemicals, and so forth. Several factors may influence the overall efficiency of the gasification; for example, gasification conditions (e.g., temperature, flow rates), type of feedstock used, oxidant (e.g., air, oxygen, or mixtures thereof), diluents (e.g., steam), or a combination thereof may influence the composition and the amount of producer gas generated, and consequently the heating value of the producer gas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gasification system includes a gasifier configured to gasify a feedstock and an oxidant to generate a producer gas, a steam generator configured to supply steam to the gasifier, and a combustion system that supplies an exhaust gas to the steam generator to produce the steam. The system also includes an exhaust gas injection system located upstream of the gasifier and fluidly coupled to the gasifier. The exhaust gas injection system supplies a portion of the exhaust gas from the combustion system to the gasifier.

In a second embodiment, a method includes providing a fuel source and a gasifying agent to a gasifier, supplying a steam generator fluidly coupled to the gasifier with an exhaust gas from a combustion system to produce a steam, and supplying the gasifier with a portion of the exhaust gas. The portion of the exhaust gas flows through an exhaust gas injection system fluidly coupled to the gasifier. The method also includes gasifying a mixture of the fuel source, the gasifying agent, the steam, and the portion of the exhaust gas in the gasifier to generate a producer gas.

In a third embodiment, a system includes instructions disposed on a non-transitory, machine readable medium. The instructions are configured to supply an exhaust gas injection system located upstream of a gasifier with an exhaust gas from a combustion system. The exhaust gas injection system is fluidly coupled to the gasifier. The instructions are also configured to supply a steam generator fluidly coupled to the gasifier with the exhaust gas to produce steam, and gasify a mixture of a feedstock, the steam, and the exhaust gas in the gasifier to generate a producer gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
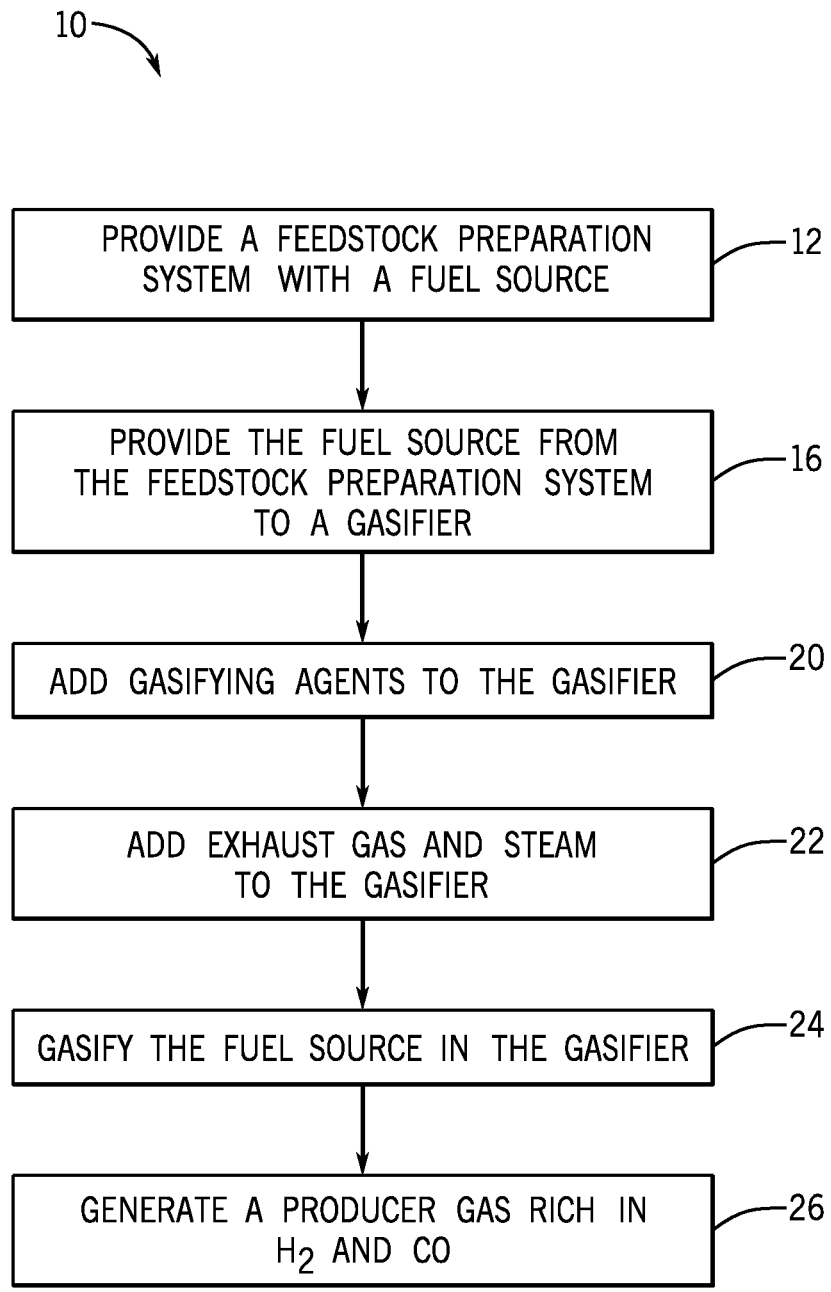
FIG. 1 is a block diagram depicting a method of generating an enriched producer gas.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for improved efficiency in a gasification system. In particular, the disclosed embodiments include an exhaust gas injection system that may distribute gases (e.g., recycle gas, such as exhaust gas) to a gasifier. The exhaust gas may be generated from a variety of combustion systems, such as furnaces, gas turbine engines, reciprocating engines, or any combination thereof. The exhaust gas may include carbon dioxide ($CO_2$), carbon monoxide (CO), water vapor, nitrogen, residual oxygen, unburnt fuel (e.g., hydrocarbons), and other components. In a gasifier, a gasifying agent (e.g., air) is introduced into the gasifier and reacts with a feedstock or fuel source to generate a producer gas (e.g., syngas) and various byproducts, such as char and ash. The resultant producer gas provides energy, in the form of heat, to a process of the gasification system. In the discussed embodiments, the exhaust gas injection system distributes the exhaust gas and supplies a portion of the exhaust gas to the gasifier. This reduces the amount of the gasifying agent needed for gasification of the fuel source and results in a producer gas enriched with carbon monoxide (CO) and hydrogen ($H_2$).

The CO and $H_2$ enriched producer gas may have a higher heating value compared to a resultant gas that has not been enriched with CO and $H_2$. The heating value may be used to define an energy characteristic of the fuel. For example, the heating value of the fuel may be defined as the amount of heat released by combusting a specified quantity of fuel. In particular, a lower heating value (LHV) may be defined as the amount of heat released by combusting a specified quantity (e.g., initially at 25° C. or another reference state) and returning the temperature of the combustion products to a target temperature (e.g., 150° C.). LHV may be represented in the units of megajoule (MJ) per kilogram (kg). In the following discussion, LHV may be used to indicate the heating value of various fuels, but it is not intended to be limiting in any way. Any other value may be used to characterize the energy and/or heat output of feedstock within the scope of the disclosed embodiments.

Turning now to the drawings, and referring to FIG. 1, a method 10 for generating a hydrogen ($H_2$) and carbon monoxide (CO) enriched producer gas is illustrated. The method 10 includes providing a fuel source to a feedstock preparation system to prepare the fuel source for gasification (block 12). The fuel source may include any type of carbonaceous fuel, such as, coal, petcoke, and biomass. For example, the biomass may include agricultural wastes, wood, saw dust, and the like. The feedstock preparation system may reduce the size of the fuel source to a size suitable for gasification. The feedstock preparation system may also dry the fuel source to reduce the moisture content of the fuel source to a desired range for efficient gasification.

The method 10 also includes providing a gasifier with the fuel source processed in the feedstock preparation system (block 16). While in the gasifier, the fuel source is partially oxidized. As part of the partial oxidation, the fuel source may be heated to undergo a pyrolysis process. According to certain embodiments, temperatures inside the gasifier may range from approximately 150° C. to 700° C. during the pyrolysis process, depending on the type of fuel source utilized. The heating of the fuel source during the pyrolysis process may generate a solid (e.g., char) and residue gases (e.g., carbon monoxide (CO) and hydrogen ($H_2$)).

Before, during, or after addition of the fuel source to the gasifier, the method 10 also includes adding one or more gasifying agents to the gasifier (block 20). Addition of the gasifying agents to the gasifier allows the fuel source to undergo a partial oxidation process. The gasifying agents may include air, nitrogen ($N_2$), carbon dioxide ($CO_2$), oxygen ($O_2$), steam, or a combination thereof. The char (carbon) and residue gases may react with the gasifying agents to form $CO_2$ and CO, which provide heat for any subsequent gasification reactions. According to certain embodiments, temperatures during the partial oxidation process may range from approximately 700° C. to 1600° C.

In addition to (or as part of) adding the gasifying agents to the gasifier, the method 10 includes adding an exhaust gas and steam to the gasifier (block 22). The exhaust gas is generated by a power generating device (e.g., a combustion system) that is fluidly coupled to the gasifier through an exhaust gas injection system (e.g., conduits, injection nozzles, valves, etc). The combustion system may include a gas turbine engine, an internal combustion engine, a furnace, or any combination thereof. Furthermore, the steam may be generated using heat from the exhaust gas, e.g., in a heat recovery steam generator (HRSG). The addition of the exhaust gas and the steam react may increase the amount of CO and $H_2$ generated during the gasification of the fuel source.

After the fuel source, the gasifying agents, and the exhaust gas from the power generating device have been added to the gasifier, the method 10 includes gasifying the fuel source (block 24). As depicted in Scheme 1 below, during the gasification process, the steam introduced into the gasifier may react with the char to produce $H_2$, CO, and $CO_2$ (reaction 1). The steam may also react with the CO generated during the gasification process to generate more $CO_2$ and $H_2$ through a process known as the water-gas shift reaction (Scheme 1, reaction 2). Furthermore, the steam may react with methane ($CH_4$) produced during the combustion process to generate additional CO and $H_2$ (Scheme 1, reaction 3).

Scheme 1

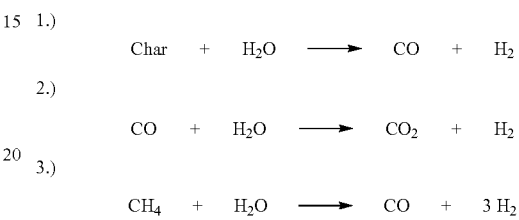

In addition to the reactions between the char and the steam, the char may also react with $CO_2$ during a process known as the Boudouard reaction, depicted in Scheme 2 below, to produce more CO. The Boudouard reaction is bidirectional, i.e. CO may produce $CO_2$ and char (carbon) as well. Non-gasifiable char is undesirable, so it is beneficial for the Boudouard reaction to create CO and reduce the amount of char. To this end, $CO_2$ may be injected into the gasifier to minimize the amount of char generated during the Boudouard reaction. In certain embodiments, the $CO_2$ is provided from an exhaust gas produced by a combustion system (e.g., a furnace, gas turbine, or reciprocating engine) in the gasification system, as described in detail below.

Scheme 2

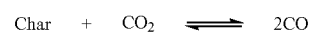

As the fuel source has undergoes the gasification process, the method 10 generates a producer gas enriched in $H_2$ and CO (block 26). As discussed above, the steam reacts with the char, CO, and $CH_4$ to produce $H_2$ and the exhaust gas also reacts with the char to produce CO through the Boudouard reaction. Consequently, the producer gas generated has an increased amount of $H_2$ and CO compared to a producer gas generated without steam and the exhaust gas.

Figure 2:
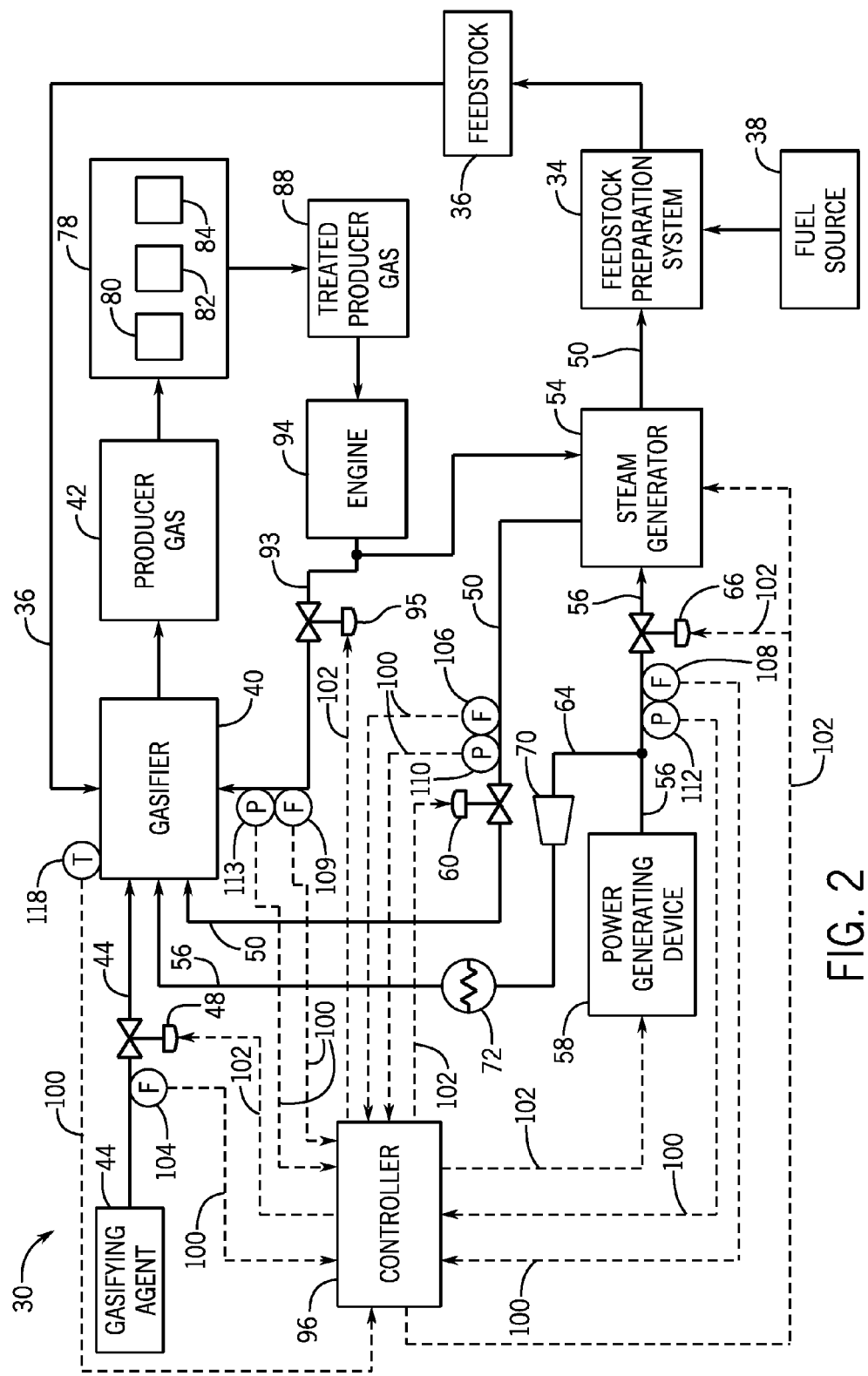
FIG. 2 is a schematic block diagram of an embodiment of a gasification system including an exhaust gas injection system and a steam generator.

Present embodiments also include a gasification system configured to perform the method 10 to generate the producer gas enriched in $H_2$ and CO. FIG. 2 is a block diagram of an embodiment of one such gasification system 30 that is configured to generate the producer gas. Specifically, the system 30 includes a feedstock preparation system 34 that prepares a feedstock 36 using a fuel source 38 (e.g., in accordance with the acts of block 12 (FIG. 1)). For example, the feedstock preparation system 34 may resize or reshape the fuel source 38 by chopping, milling, shredding, pulverizing, briquetting, or pelletizing the fuel source 38. Accordingly, the feedstock preparation system 34 may include one or more grinders, mills, or any similar unit that may produce smaller particles from large particles of the fuel source 38 during operation. In addition, the resized or reshaped fuel source 38 may be dried to reduce the moisture content of the fuel source 38. Therefore, the feedstock preparation system 34 may also include one or more perforated bin dryers, band conveyors, rotary cascade dryers, or any other suitable drying unit that may reduce the moisture content of the fuel source 38. The fuel source 38 may include coal, petcoke, and biomass. For example, the fuel source 38 may include bituminous coal, sub-bituminous coal, lignite, agricultural waste (e.g., wood, saw dust, and the like), or a combination thereof.

Following preparation, the feedstock 36 may be directed into a gasifier 40, according to the acts of block 16 (FIG. 1). For example, the feedstock 36 may be directed into the gasifier 40 using one or more solids transport devices, such as screw conveyers, globe pumps, diaphragm pumps, augers, impellers, or any other suitable solid transport device. It should be noted that the feedstock 36 may be directed to a weighing mechanism prior to entering the gasifier 40. The gasifier 40 may be part of an integrated gasification combined cycle (IGCC) power plant or any other variety of plants that use or produce a producer gas 42. The gasifier 40 may be an updraft or downdraft fixed-bed gasifier, a fluidized-bed gasifier, such as a bubbling fluidized-bed gasifier or a circulating fluidized-bed gasifier, or moving bed gasifier.

While in the gasifier 40, the feedstock 36 undergoes a series of reactions, which are collectively referred to as the gasification process. The gasification process may include partial oxidation of the feedstock 36. As discussed above, during the partial oxidation, the feedstock 36 may be heated to undergo a pyrolysis process that generates the char and the residual gases. The partial oxidation of the feedstock 36 is achieved by introducing one or more gasifying agents 44 into the gasifier 40 (e.g., according to block 20 (FIG. 1)). The gasifying agent 44 generally includes an oxidant, and may include, but is not limited to, pressurized or atmospheric air, oxygen gas, or a combination thereof. It should also be noted that the gasifying agent 44 may be preheated prior to entering the gasifier 40. The feedstock 36 is partially oxidized at sub-stoichiometric fuel-to-air ratios, according to the acts of block 24 (FIG. 1), to produce, along with some CO and $H_2$, $CO_2$, water ($H_2O$), and a hot ash bed. The fuel-to-air ratio may be adjusted by a control valve 48 configured to control the amount of the gasifying agent 44 that enters the gasifier 40 to promote, for example, one or more partial oxidation reactions.

The partial oxidation reaction is generally exothermic and produces, in certain embodiments, temperatures within the gasifier 40 of between approximately 700° C. to 1600° C. As an example, the temperatures within the gasifier 40 may reach approximately 700° C., 900° C., 1000° C., 1450° C., 1500° C., 1550° C., 1600° C., or more during the sub-stoichiometric partial oxidation reaction. The $CO_2$ and $H_2O$ produced by the combustion reaction may pass through, or otherwise contact, the char or ash bed and undergo a reduction to generate CO, $H_2$, and some $CH_4$. It should be noted that the reduction process may be facilitated by addition of a catalyst. The reduction reaction that is performed to produce the CO and $H_2$ is endothermic, and therefore requires heat. The bulk of the reduction reaction may therefore use heat produced by the partially oxidation reaction, and may also use any latent heat from the hot char or ash bed.

In addition to introducing the gasifying agent 44 to the gasifier 40, in one embodiment, steam 50 may also be added to the gasifier 40 as another gasifying agent, in accordance with the acts of block 22 (FIG. 1). The steam 50 increases the partial pressure of the $H_2O$ in the gasifier 40, favoring water-gas, water-gas shift, and steam reforming reactions. During the gasification process, the steam 50 reacts with the char, CO, and $CH_4$ produced during the partial oxidation processes to produce CO and $H_2$ at temperatures ranging from approximately 700° C. to 1600° C. In essence, the gasifier 40 utilizes the steam 50 and the gasifying agent 44 to allow some of the feedstock 36 to be partially oxidized to produce CO and release energy, which drives a second reaction that converts additional feedstock 36 to $H_2$ and additional $CO_2$.

In this way, the gasifier 40 manufactures the producer gas 42 enriched with $H_2$. In one embodiment, the addition of the steam 50 during the gasification process may increase the amount of $H_2$ in the producer gas 42 by approximately 30% compared to gasification of the feedstock 36 without the steam 50. For example, the producer gas 42 may have 1%, 2%, 3%, 4%, 5%, 6%, 7%, 8%, 9%, 10%, or more $H_2$ than a resultant gas produced without the steam 50. Furthermore, the steam 50 may reduce undesirable byproducts from the gasification process, such as tar, soot, and other residues.

The gasification system 30 includes a steam generator 54 (e.g., a heat recovery steam generator) that supplies the steam 50 to the gasifier 40. The steam generator 54 receives and processes an exhaust gas 56 originating from a power generating device 58 (e.g., combustion system such as a combustion engine) to produce the steam 50 at a high pressure and high temperature. Again, the device 58 may include a variety of combustion systems, such as gas turbine engines, reciprocating piston-in-cylinder engines, furnaces, or any combination thereof. The steam generator 54 may form part of a heat recovery steam generator (HRSG) system and include one or more heat exchangers, condensers, and various heat recovery equipment, which collectively function to transfer heat from the exhaust gas 56 to a stream of water, thereby generating the steam 50. The steam 50 may also be supplied to any other processes where steam may be used, such as to the feedstock preparation system 34. In embodiments where the steam 50 is directed to the gasifier 40, the steam 50 may be pre-heated prior to entering the gasifier 40 to facilitate higher gasification temperatures. Although the steam 50 and the gasifying agents 44 are depicted as separate streams, in certain embodiments the steam 50 and the gasifying agent 44 may enter the gasifier 40 as a single stream (e.g., a single gasifying agent stream). In some embodiments, the gasification system 30 includes a control valve 60 that controls or adjusts a flow rate of the steam 50 into the gasifier 40. For example, in certain embodiments, the control valve 60 may be used to provide the steam 50 at a flow rate of approximately 100 to 900 kg/hr.

As discussed above, the exhaust gas 56 entering the steam generator 54 is generated by the power generating device 58 during operation. The power generating device 58 may include a gas turbine engine, an internal combustion engine with reciprocating pistons, or any other suitable gas-powered engine. For example, the engine may include an internal combustion engine with 1 to 30, 4 to 20, or 8 to 16 cylinders and associated reciprocating pistons. In an embodiment, the power generating device 58 is fluidly coupled to the gasifier 40 through an exhaust gas injection system 64. The exhaust gas injection system 64 may include conduits, injection nozzles, valves, or any other suitable feature to supply the gasifier 40 with the exhaust gas 56. A control valve 66 may apportion the exhaust gas 56 between the steam generator 54 and the exhaust gas injection system 64. The control valve 66 may also adjust a flow rate of the exhaust gas 56 entering the steam generator 54, thereby adjusting the flow rate of the exhaust gas 56 entering the exhaust gas injection system 64. In other words, increasing the flow rate of the exhaust gas 56 to the steam generator 54 by opening the control valve 66 may decrease the flow rate of the exhaust gas 56 to the exhaust gas injection system 64.

During operation of the gasification system 30, the exhaust gas injection system 64 flows a portion of the exhaust gas 56 to the gasifier 40, thereby reducing the amount of other gasifying agent 44 used in the gasification process (in accordance with the acts of block 22 (FIG. 1)). While in the gasifier 40, the exhaust gas 56 and the char undergo the Boudouard reaction to produce additional CO and $H_2$ at temperatures above 700° C. Consequently, in addition to being enriched in $H_2$, as discussed above, the producer gas 42 may also be enriched with CO (in accordance with the acts of block 26 (FIG. 1)). In one embodiment, the producer gas 42 may have approximately 20% more CO compared to a producer gas generated without the exhaust gas 56. For example, the producer gas 42 may have 1%, 2%, 3%, 4%, 5%, 6%, 7%, 8%, 9%, 10%, 11%, 12%, 13%, 14%, 15%, or more CO than a resultant gas produced without the exhaust gas 56. As a result, the $H_2$ and CO enriched producer gas 42 may have an LHV of at least between approximately 10% to 30% more compared to a resultant gas produced without the steam 50 and exhaust gas 56.

As discussed above, the exhaust gas injection system 64 flows the exhaust gas 56 to the gasifier 40. Accordingly, the gasification system 30 may have certain features and/or processes that motivate the exhaust gas 56 to flow through the exhaust gas injection system 64. One such feature may include a flow inducing device 70 such as a compressor, a blower or a fan. For example, as illustrated in FIG. 2, the flow inducing device 70 located along the exhaust gas injection system 64 may drive the exhaust gas 56 throughout the exhaust gas injection system 64 and into the gasifier 40. In embodiments where the flow inducing device 70 is a blower, the blower, while in operation, may operate at any speed suitable for driving the exhaust gas 56 throughout the exhaust gas injection system 64 and into the gasifier 40. In embodiments where the flow inducing device 70 is a compressor, while in operation, the compressor may reduce the volume of the exhaust gas 56 resulting in an increase in pressure of the exhaust gas 56, which motivates the exhaust gas 56 to flow through the exhaust gas injection system 64. The compressor may include a centrifugal compressor, a reciprocating compressor, a rotary vane compressor, or any other suitable compressor. In another embodiment, the exhaust gas 56 may flow through the exhaust gas injection system 64 and into the gasifier 40 as a result of a pressure differential between the gasifier 40 and the exhaust gas injection system 64. In other words, the pressure at the exhaust gas injection system 64 may be greater than the pressure at the gasifier 40. Such a pressure differential may be created by a vacuum located downstream of the gasifier 40.

While in the exhaust gas injection system 64, it may be desirable to cool the exhaust gas 56 prior to entering the gasifier 40. In one embodiment, an indirect heat exchanger 72 may be positioned upstream of the gasifier 40 along the exhaust gas injection system 64. Accordingly, the exhaust gas 56 may be cooled to a desired temperature, via indirect heat exchange with the indirect heat exchanger 72, as it flows through the exhaust gas injection system 64 into the gasifier 40. In another embodiment, the exhaust gas 56 may be quenched with a fluid stream and cooled by direct heat exchange upstream of the gasifier 40. For example, the exhaust gas 56 may be mixed with the gasifying agent 44, the steam 50, or a combination thereof, to cool the exhaust gas 56 to a temperature suitable for gasification in the gasifier 40. In this particular embodiment, the heat exchanger 72 may not be used for cooling the exhaust gas 56, and may therefore be omitted or bypassed. While it may be desirable to cool the exhaust gas 56 prior to entering the gasifier 40, in other embodiments, the exhaust gas 56 is not cooled before entering the gasifier 40.

The gasification process, as noted above, produces CO, $H_2$, tar, char, and other gases (e.g., diluents, $N_2$, acid gases). In certain embodiments, the combination of gases (e.g., producer gas 42) formed in the gasifier 40 exits the gasifier 40 and is directed to a gas treating system 78. The gas treating system 78 may include one or more scrubbers, and other filters interconnected by tubes, pipes, or conduits. For example, in one embodiment, the gas treating system 78 may include first, second, and third scrubbers 80, 82, and 84, in series, that remove impurities such as fines (e.g., fines particles), tar, and other entrained gases (e.g., hydrogen chloride) from the producer gas 42 through processes such as water scrubbing, sour water stripping, absorption, decomposition, and/or selective stripping to produce a treated producer gas 88.

In certain embodiments, the third scrubber 84 may include a chilled water scrubber. In the third scrubber 84, the producer gas 42 may undergo additional filtering, desiccation, and cooling. For example, a stream of chilled water may flow into the third scrubber 84 to exchange heat with the producer gas 42, thereby cooling the treated producer gas 88. The water utilized in the third scrubber 84 may be sent to a chilled water tank and recirculated, a water treatment facility, or a similar plant feature.

During normal operation of the gasification system 30, the treated producer gas 88 is provided to an engine 94 (e.g., power generation system). In certain embodiments, the engine 94 may include one or more gas turbine engines or an internal combustion engine with reciprocating pistons, or any other suitable gas-powered engine having a prime mover, such as a compression or spark ignition engine. For example, the engine may include an internal combustion engine with 1 to 30, 4 to 20, or 8 to 16 cylinders and associated reciprocating pistons. In these embodiments, the engine 94 may drive a generator that produces electricity. However, in other embodiments, the engine 94 may be any suitable type of power generation system. In certain embodiments, a valve 95 may provide exhaust gas 93 to the gasifier 40 alone or in combination with the exhaust gas 56 from the power generating device 58.

A controller 96 may independently control operation of the gasification system 30 by electrically communicating with sensors and control valves or other flow adjusting features throughout the gasification system 30. In the illustrated embodiment, each flow line (including lines 50, 56, and 93) include 1, 2, 3, 4, 5, or more valves and sensors coupled to the controller 96. The controller 96 may include a distributed control system (DCS) or any computer-based workstation that is fully or partially automated. For example, the controller 96 can be any device employing a general purpose or an application-specific processor, both of which may generally include memory circuitry for storing instructions such as gasification parameters, such as the gasification conditions of the feedstock 36. The processor may include one or more processing devices, and the memory circuitry may include one or more tangible, non-transitory, machine-readable media collectively storing instructions executable by the processor to perform the acts of FIGS. 1 and 2, discussed above, and FIG. 3, as discussed below, and control actions described herein.

In one embodiment, the controller 96 may operate control devices to control amounts and/or flows between the different system components. It should be noted that there may be additional valves throughout the gasification system 30 used to adjust different amounts and/or flows between the system components. In the illustrated embodiment, the controller 96 governs operation of a control device, such as the valves 48 and 60, to adjust a flow of the gasifying agent 44 and steam 50, respectively, into the gasifier 40. The controller 96 may also govern operation of valves 66 and 95 to control an amount or adjust a flow of the exhaust gas 56 and exhaust gas 93, respectively, that enters the steam generator 54 and the gasifier 40. In certain embodiments, the control device may be part of a weighing mechanism that measures the amount of the feedstock 36 before it enters the gasifier 40. The controller 96 may also adjust a flow of the feedstock 36 that enters the gasifier 40.

In certain embodiments, the controller 96 may use information provided via input signals 100 to execute instructions or code contained on a machine-readable or computer-readable storage medium and generate one or more output signals 102 to the various control devices (e.g., valves 48, 66, 68, and 95). For example, based on the execution of the instructions or code contained on the machine-readable or computer-readable storage medium of the controller 96, the output signals 102 may be used to control a temperature of the gasifier 40 or the flow of the gasifying agent 44, steam 50, exhaust gas 56, exhaust gas 93, or a combination thereof. In particular, the controller 96 may sense signals from a flow sensor 104 to monitor the amount of gasifying agent 44 entering the gasifier 40. Similarly, the controller 96 may sense signals from flow sensors 106, 108, and 109 and/or pressure transducers 110, 112, and 113 to monitor the amount of steam 50, exhaust gas 64, or exhaust gas 93, respectively, entering the gasifier 40. For example, if the flow rate of the exhaust gas 64 is too high, the controller 96 may sense an increase in pressure downstream of the blower 70. The controller 96 may then adjust the flow rate of the exhaust gas 64 to a more desirable flow rate. In yet a further embodiment, the controller 96 may monitor and control the output of the steam generator 54, the power generating device 58, and the engine 94 to adjust the amount of steam 50, exhaust gas 64, and exhaust gas 93 generated and supplied to the gasifier 40.

In other embodiments, the controller 96 may sense signals from temperature sensor 118. For example, if too much gasifying agent 44 is added to the gasifier 40, the controller 96 may sense that the temperature is outside of the desired range. The controller 96 may then adjust any of the parameters of the gasification system 30 to return the temperature to the desired range. Furthermore, the controller 96 may also monitor the temperature of the exhaust gas 64 downstream of the heat exchanger 72. For example, if the exhaust gas 64 is too hot, the controller 96 may sense an exhaust gas temperature outside a desired range and adjust the heat exchanger 72 such that the exhaust gas 64 is within a desired temperature range.

Figure 3:
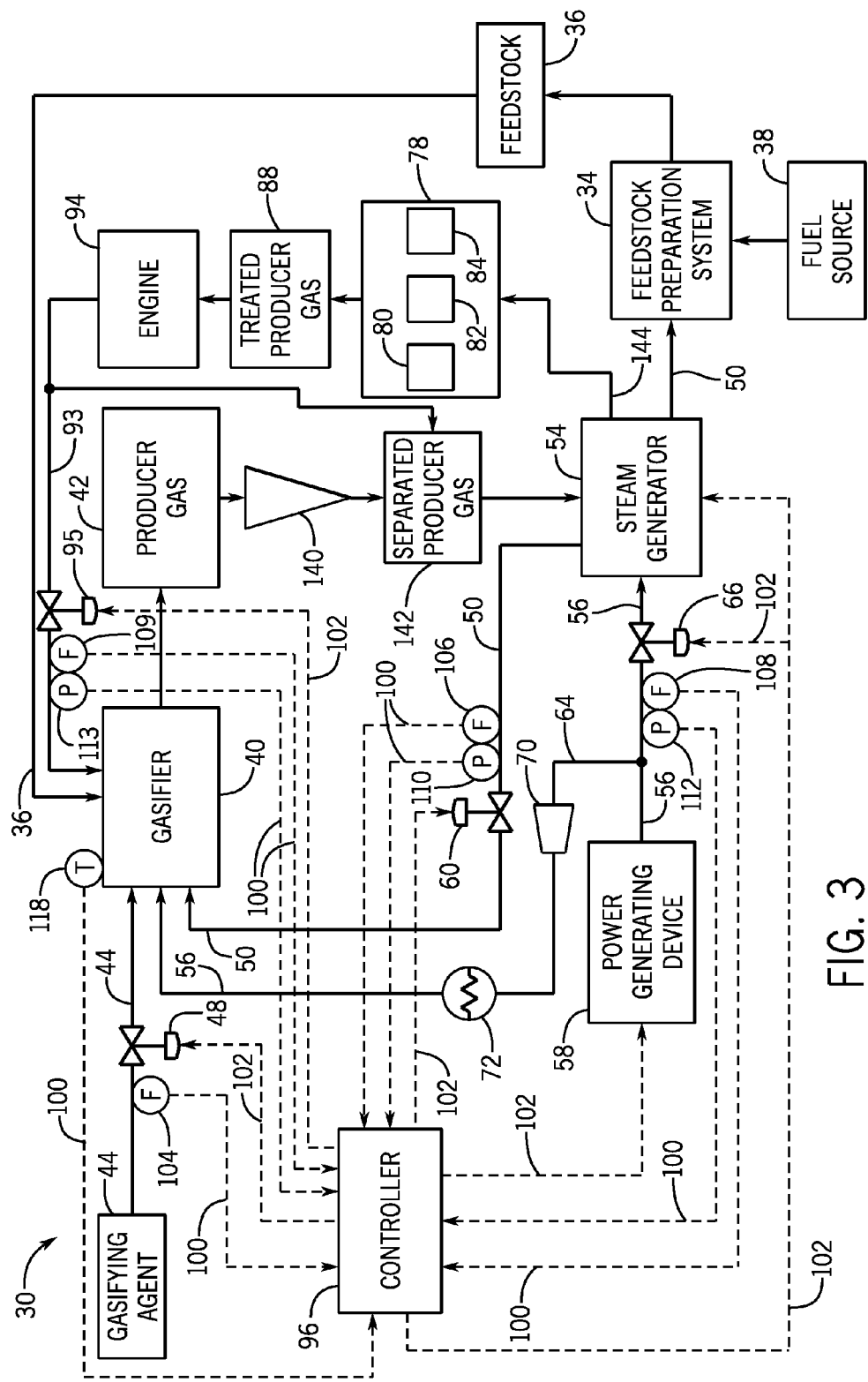
FIG. 3 is a schematic block diagram of an embodiment of the gasification system, as illustrated in FIG. 2.

Turning now to FIG. 3, an embodiment of the gasification system 30 that prepares the $H_2$ and CO enriched producer gas 42 during operation according to the acts of method 10 (FIG. 1) is shown. Elements in FIG. 3 in common with those shown in FIG. 2 are labeled with the same reference numerals. In the illustrated embodiment, the gasification system 30 prepares the producer gas 42, as described above.

Following preparation, the enriched producer gas 42 is directed to a cyclone 140 or other suitable separation system that separates fines (i.e., fine particles) from the enriched producer gas 42 to generate a separated producer gas 142. In certain embodiments, the cyclone 140 may include wet scrubbers, electrostatic precipitators, or barrier filters, such as metal or ceramic porous candle filters, bag filters, packed bed filters, or a combination thereof. The separated producer gas 142 flows through the steam generator 54 and indirectly transfers heat to the stream of water in the steam generator 54 to produce the steam 50. The separated producer gas 142 enters the gas treating system 78, located downstream of the steam generator 54, to remove any remaining undesirable impurities (e.g., diluents, $N_2$, acid gases, etc.), as described above, before entering the power generation system 94. In other respects, the gasification system 30 shown in FIG. 3 is similar to the system 30 shown in FIG. 2.

Technical effects of the invention include the gasification system 30 recovering exhaust gases (e.g., exhaust gas 56) from a power generating device 58 (e.g., combustion system), and directing those gases to the gasifier 40 to generate the producer gas 42. The disclosed systems 30 may employ an exhaust injection system 64 to receive and distribute the exhaust gas 56 from the power generating device 58 within the gasification system 30. The exhaust gas 56 increases the amount of CO in the producer gas 42, thereby helping to improve the LHV of the producer gas 42 and the efficiency of the gasification system 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gasification system, comprising:
a gasifier configured to gasify a feedstock and an oxidant to generate a producer gas enriched with carbon monoxide (CO) and hydrogen ($H_2$);
a heat recovery steam generator configured to be fluidly coupled to the gasifier and configured to supply steam to the gasifier;
a combustion system configured to be fluidly coupled to the heat recovery steam generator, wherein the combustion system is configured to supply an exhaust gas to the steam generator to produce the steam;
an exhaust gas injection system located upstream of the gasifier and fluidly coupled to the gasifier, wherein the exhaust gas injection system is configured to supply a portion of the exhaust gas from the combustion system to the gasifier; and
a controller comprising a non-transitory, machine-readable medium storing instructions configured to supply the exhaust gas injection system with a first portion of the exhaust gas from the combustion system and to supply the steam from the heat recovery steam generator to the gasifier to enrich the producer gas with CO and $H_2$ such that the producer gas has at least:
approximately 30% more $H_2$; and approximately 20% more CO compared to a producer gas generated with the oxidant, but without the exhaust gas and the steam.

2. The system of claim 1, wherein the exhaust gas injection system comprises a valve configured to apportion the exhaust gas between the heat recovery steam generator and the exhaust gas injection system.

3. The system of claim 2, wherein the valve is configured to adjust a flow rate of the exhaust gas to the heat recovery steam generator.

4. The system of claim 1, wherein the exhaust gas injection system comprises a flow inducing device configured to motivate the portion of the exhaust gas through the exhaust gas injection system and into the gasifier.

5. The system of claim 4, wherein the flow inducing device comprises a blower.

6. The system of claim 4, wherein the flow inducing device is configured to increase a pressure differential between the gasifier and the exhaust gas injection system.

7. The system of claim 1, wherein the combustion system comprises a gas turbine engine or a combustion engine.

8. The system of claim 1, wherein the gasifier is configured to transfer the producer gas to the heat recovery steam generator to transfer heat from the producer gas to a water stream to produce the steam.

9. The system of claim 1, wherein the feedstock comprises at least one of agricultural wastes, wood, saw dust, coal, or a combination thereof.

10. The system of claim 1, comprising an exhaust gas cooler configured to be disposed between the gasifier and the combustion system, wherein the exhaust gas cooler is configured to cool the portion of the exhaust gas via heat exchange before entering the gasifier.

11. The system of claim 10, wherein the exhaust gas cooler is an indirect heat exchanger located within the exhaust gas injection system.

12. The system of claim 1, wherein the exhaust gas is cooled via direct heat exchange between the exhaust gas and the oxidant.

13. The system of claim 1, comprising a gas treating system comprising one or more scrubbers, wherein the one or more scrubbers are configured to treat the producer gas from the gasifier and to generate a treated producer gas.

14. A method, comprising:
providing a fuel source and a gasifying agent to a gasifier;
supplying a heat recovery steam generator fluidly coupled to the gasifier with a first portion of an exhaust gas from a combustion system to produce steam, wherein the heat recovery steam generator supplies at least a portion of the steam to the gasifier;
supplying the gasifier with a second portion of the exhaust gas, wherein the second portion of the exhaust gas flows through an exhaust gas injection system located upstream of and fluidly coupled to the gasifier; and
gasifying a mixture of the fuel source, the gasifying agent, the steam, and the portion of the exhaust gas in the gasifier to generate a producer gas enriched with carbon monoxide (CO) and hydrogen ($H_2$), wherein gasification of the fuel source with the portion of the steam and the second portion of the exhaust gas enrich the producer gas with approximately 30% more $H_2$ and approximately 20% more CO compared to a producer gas generated with the gasifying agent, but without the exhaust gas and the steam.

15. The method of claim 14, comprising motivating the flow of the portion of the exhaust gas through the exhaust gas injection system using a flow inducing device configured to motivate the flow of the second portion of the exhaust gas through the exhaust gas injection system and into the gasifier.

16. The method of claim 14, comprising adjusting the flow of the second portion of the exhaust gas entering the gasifier with a valve configured to apportion the exhaust gas between the heat recovery steam generator and the exhaust gas injection system.

17. The method of claim 14, wherein the combustion system comprises a gas turbine engine or a combustion engine.

18. The method of claim 14, comprising transferring heat from the producer gas to a water stream in the heat recovery steam generator to produce the steam.

19. A system, comprising:
instructions disposed on a non-transitory, machine readable medium, wherein the instructions are configured to:
supply an exhaust gas injection system located upstream of a gasifier with an exhaust gas from a combustion system, wherein the exhaust gas injection system is fluidly coupled to the gasifier;
supply a heat recovery steam generator fluidly coupled to the gasifier with the exhaust gas to produce steam;
supply at least part of the steam from the heat recovery steam generator to the gasifier; and
gasify a mixture of a feedstock, the steam, and the exhaust gas in the gasifier to generate a producer gas, wherein supplying the exhaust gas and the steam to the gasifier comprises enriching the producer gas with carbon monoxide (CO) and hydrogen ($H_2$) such that the producer gas has at least approximately 30% more $H_2$ and 20% more CO compared to a producer gas generated with an oxidant, but without the exhaust gas and the steam.

20. The system of claim 19, comprising a controller having the instructions.

21. The system of claim 19, wherein the instructions are configured to control operation of an integrated gasification combined cycle (IGCC) power plant having the gasifier and the heat recovery steam generator.

22. The system of claim 1, comprising instructions disposed on a non-transitory, machine readable medium, wherein the instructions are configured to:
supply the exhaust gas injection system with a first portion of the exhaust gas from the combustion system;
supply the heat recovery steam generator with a second portion of the exhaust gas;
supply at least a portion of the steam from the heat recovery steam generator to the gasifier; and
gasify a mixture of the feedstock, the steam, and the exhaust gas in the gasifier to generate the producer gas.

23. The method of claim 14, wherein instructions disposed on a non-transitory, machine readable medium are configured to supply the heat recovery steam generator with the first portion of the exhaust gas from the combustion system, supply the second portion of the exhaust gas from the combustion system to the exhaust injection system, supply the gasifier with the steam from the heat recovery steam generator; and gasify the mixture of the fuel source, the gasifying agent, the steam, and the second portion of the exhaust gas.

* * * * *